United States Patent [19]

Bickoff et al.

[11] 3,959,246

[45] May 25, 1976

[54] PREPARATION OF SOLUBLE EDIBLE PROTEIN FROM LEAFY GREEN CROPS

[75] Inventors: Emanuel M. Bickoff, Oakland; Donald de Fremery, Orinda; Richard H. Edwards, Albany; Benny E. Knuckles, San Pablo; George O. Kohler, El Cerrito; Raymond E. Miller, Richmond, all of Calif.

[73] Assignee: The United States of America as represented by the Secretary of Agriculture, Washington, D.C.

[22] Filed: July 8, 1974

[21] Appl. No.: 486,703

[52] U.S. Cl............................................. 260/112 R
[51] Int. Cl.$^2$............................................. A23J 1/14
[58] Field of Search ................................ 260/112 R

[56] References Cited
UNITED STATES PATENTS

| | | | |
|---|---|---|---|
| 2,600,903 | 6/1952 | Miller | 426/311 |
| 3,637,396 | 1/1971 | Hollo et al. | 260/112 X |
| 3,684,520 | 8/1972 | Bickoff et al. | 260/112 UX |
| 3,823,128 | 7/1974 | Bickoff et al. | 260/112 |

OTHER PUBLICATIONS

J. of Biol. Chem., Vol. 49, 1921, pp. 63–91, Osborne et al.
J. Sci. Food Agric., July, 1961, pp. 502–512, Chayen et al.

*Primary Examiner*—Howard E. Schain
*Attorney, Agent, or Firm*—M. Howard Silverstein; Max D. Hensley; William Takacs

[57] ABSTRACT

Juice obtained from alfalfa or other leafy green crops is processed to isolate a cream-colored protein fraction which is soluble, odorless, bland (essentially tasteless) and useful for human nutrition. The juice is first treated to remove chloroplastic proteins, chlorophyll, carotenoids, and lipids. The residual juice containing the desired cytoplasmic proteins is treated by novel procedures—e.g., acid precipitation in the cold or by membrane filtration followed by acid precipitation at ambient temperature—to isolate the soluble bland protein.

4 Claims, No Drawings

PREPARATION OF SOLUBLE EDIBLE PROTEIN FROM LEAFY GREEN CROPS

DESCRIPTION OF THE INVENTION

This invention relates to and has among its objects the provision of novel processes for fractionating alfalfa and other leafy green crops whereby to obtain a soluble food-grade protein. Further objects of the invention will be evident from the following description wherein parts and percentages are by weight unless otherwise specified.

In the following description, emphasis is directed to the treatment of alfalfa, which constitutes the major forage crop in the United States. Reference to this particular material is, however, made by way of illustration, not limitation. In its broad ambit, the invention is applicable to leafy green crops in general, for example, grasses, lespedeza, clover, alfalfa, and similar conventional forages, and other leafy green vegetable materials such as lettuce, cabbage, kale, pea or bean vines, celery tops, beet tops, and the like, grown deliberately for animal feeding or available as wastes or by-products from food packaging or processing establishments.

It is well-known that alfalfa is a rich source of valuable nutrients including proteins, carotene (provitamin A), lipids, sugars, mineral salts, unidentified growth factors (UGF), etc., and procedures have been advocated for separating various of these components. In general, these procedures are useful only to furnish products useful for animal feeding. Attempts have been made to isolate the proteins so that they could be used for food purposes, for instance, to enrich grains or other foods low in protein content. These attempts have not met with success because the isolates were contaminated with other alfalfa components so that they could not be used for food purposes. Typically, the isolates contained substantial proportions of chlorophyll; they were green in color and bitter in taste so that they could not be used in food products.

In U.S. Pat. No. 3,684,520 to Bickoff, Spencer, and Kohler, there is disclosed a process for fractionating alfalfa which yields—among other fractions—a protein concentrate. This product is valuable as a high-energy ration for feeding animals, particularly poultry. Although the product is rich in proteins, it also contains substantial proportions of other substances such as lipids, chlorophyll, tannins, and various phenolic pigments. Consequently, it is not suitable for human use.

An improved process for fractionating alfalfa which yields a protein concentrate suitable for human consumption is disclosed in the co-pending application of Bickoff and Kohler, Ser. No. 360,251, filed May 14, 1973, now U.S. Pat. No. 3,823,128, which is a continuation-in-part of Ser. No. 147,947, filed May 28, 1971, now abandoned. Basically, this process involves the following steps: Fresh green alfalfa is pressed to obtain a juice and a press cake. The juice is subjected to a special heat treatment to form an agglomerate containing chloroplastic proteins, chlorophyll, carotenoids, and lipids while retaining cytoplasmic proteins in solution in the juice. The said agglomerate is removed by centrifugation, leaving as residue the liquid (termed the clear juice) which contains the cytoplasmic proteins. This clear juice is then treated to isolate the protein therefrom, and this may be accomplished by these alternative procedures: (a) acid precipitation at a pH of 3–4.8, (b) heating to above 65° C., e.g., 70°–90° C., or (c) addition of acid to provide a pH of 3–4.8 plus heating to above 60° C., e.g., 65°–80° C.

Although the procedure of Ser. No. 360,251 yields a protein suitable for human consumption, this product is subject to certain disadvantages in that it has few functional properties and has low solubilty. With regard to the latter item, this product like many other proteins is insoluble in water at the iso-electric point, or point of minimum solubility, which in this case is within the pH range of 3.5–5.5. However, even at pH values less than 3.5 and greater than 5.5, it dissolves in water to the extent of less than 0.1 g. per 100 g. water. Thus although the protein product of Ser. No. 360,251 is suitable for human consumption, its use is limited to fortification of products where solubility in water and related functional properties are not important. The product in question exhibits low solubility because it is denatured during its preparation. Such denaturation was considered, heretofore, as an unavoidable consequence in isolation of the substance from green leafy materials.

The invention described herein provides the means for obviating the above problems. Application of the process of the invention yields a soluble bland protein eminently suited for human nutritional needs. The instant process thus avoids the undesirable denaturation that occurs in known procedures.

One of the advantages of the invention is that a soluble protein product is obtained. This product will dissolve in water, on either side of the iso-electric point, that is, at pH values below 3.5 or above 5.5, to the extent of at least 5 g. per 100 g. of water.

Another advantage of the invention is that the protein product is not bitter.

Still another advantage of the invention is that the protein product has a very low content of ash and other impurities. Generally, the products of the invention contain more than 95% protein.

The objects of the invention are obtained by applying the following procedure: As a preliminary step, a clear juice is prepared from fresh alfalfa or other green leafy vegetable material as described in Operations I and II in Ser. No. 360,251, now U.S. Pat. No. 3,823,128, the disclosure of which is incorporated herein by reference. The clear juice is then subjected to either of two novel processes, herein referred to as Modifications A and B. 360,251

Modification A in accordance with the invention involves the following major operations:

The clear juice is cooled to a temperature of 0°–5° C. and acidified to a pH of 3.5–5.5 whereby to precipitate a protein fraction.

Optionally, the precipitated protein fraction may be further purified by applying membrane filtration.

Modification B in accordance with the invention involves the following major operations.

Ultrafiltration is applied to the clear juice to fractionate it into a concentrate containing the higher molecular weight (desired) protein and a permeate containing lower molecular weight proteins and other impurities.

Diafiltration is then applied to the above concentrate to further remove impurities.

The so-obtained concentrate is then acidified to a pH of 3.5–5.5 while maintained at ambient (room) temperature to precipitate the protein product.

DETAILED DESCRIPTION OF THE INVENTION

The practice of the invention is next described in detail. It should be noted that application to alfalfa is by

PRELIMINARY OPERATIONS

Preliminarily, alfalfa is treated as described in Ser. No. 360,251 to prepare a clear juice. To this end, fresh green alfalfa, preferably in chopped form, is pressed to obtain the juice therefrom. Prior to pressing, the alfalfa may be mixed with one or more additives, e.g., sodium metabisulphite or other source of sulphite ion ammonia or other alkalizer, ascorbic acid, or ethoxyquin. The juice resulting from the pressing of the alfalfa with or without additives is then treated to selectively remove a fraction containing chloroplastic proteins, chlorophyll, carotenoids, and lipids, while leaving the desired cytoplasmic proteins in solution in the residual juice. To this end the pH of the press juice is adjusted, where necessary, to a level of 6–7 and is then subjected to a special heat treatment. Thus the juice is brought to a temperature of 55°–70° C. by application of very rapid heating, i.e., so that the said temperature is reached in 0.6 sec. or less. When the juice has been brought to said temperature, it is held thereat for at most a short period of time (0 to 40 seconds) and is then rapidly cooled to 40°–45° C. By such treatment there is formed an agglomerate of the chloroplastic proteins, chlorophyll, carotenoids, and lipids. By application of centrifugation, this agglomerated material is removed, leaving as a residue the clear juice containing the desired cytoplasmic proteins. This clear juice is employed as the starting material for modifications A or B in accordance with the invention.

MODIFICATION A

I. The clear juice is cooled to a temperature of about 0° to 5° C., preferably 2° C., and the pH adjusted to 3.5–5.5 by the addition of an acid such as hydrochloric phosphoric, sulphuric, or the like. The resulting precipitated protein is then collected by centrifuging, preferably with the use of a refrigerated centrifuge.

II. To remove occluded impurities, the precipitated protein is preferably washed with cold acidified water. Thus the precipitated protein is slurried in water acidified to a pH of 3.5–5.5 and at a temperature of 0°–5° C., and the protein is then collected by centrifugation, preferably using a refrigerated centrifuge.

III. Since the collected protein is at its iso-electric point it is necessary to put it into soluble form. This is done by treating it with alkali. Typically, the protein is stirred with cold water (at 5° C. or below) containing enough sodium hydroxide or other alkali to provide a pH of 7. The resulting solution is centrifuged to remove insoluble impurities and the clarified liquid is dried to yield the soluble protein in solid dry form.

As stated above, the final product (the soluble protein) may be obtained directly by drying the solution obtained in Operation III. However, it is also within the compass of the invention to apply a further purification to remove any pigments, salts, carbohydrates, and other impurities which may be present. To this end, the protein solution may be treated by such techniques as membrane filtration (including both ultra-filtration and diafiltration).

Membrane filtration involves applying the protein solution under pressure against a membrane which will retain substances having a molecular weight above a certain level but allow substances of lower molecular weight to pass through. In typical instances, one can use membranes which retain substances of molecular weight above 20,000 to 100,000 while allowing substances of smaller molecular weight to pass through.

Membrane filtration includes two different procedures which use such membranes: Ultrafiltration in which the protein solution alone is applied to the membrane, and diafiltration in which water is added to the protein solution to maintain a constant volume as water and the impurities pass through the membrane.

EXAMPLE 1

This example demonstrates the high yield of soluble protein formed under cold acid conditions in accordance with the invention.

A. A 30-ml. portion of clear juice was cooled to 2° C. and 1 N hydrochloric acid was added to obtain a pH of 3.5. The liquid containing precipitated protein was centrifuged for 15 min. at 0° C. and 2,000 × g.

B. The collected protein was slurried in 30 ml. of water at 2° C. adjusted to pH 3.5 with 1 N hydrochloric acid. This slurry was again centrifuged for 15 min. at 0° C. and 2,000 × g.

C. The collected protein was re-slurried in 20 ml. of water at 2° C., and adjusted to pH 7 by addition of 0.1 N sodium hydroxide. The slurry was centrifuged for 20 min. at 0° C. and 48,000 × g. to remove insoluble material.

The collected insoluble material was analyzed for protein. The supernatant liquid (containing the soluble protein) was also analyzed for its content of protein.

The above experiment was repeated several times with the variation that the treatments (Steps A, B, and C) were carried out at 5°, 10°, 15°, 20°, and 25° C. instead of at 2° C. The centrifugations in all cases were carried out in a refrigerated centrifuge at 0° C. The results are tabulated below:

| Experiment | Temp. of treatment, °C. | Yield of soluble protein, % of total protein |
|---|---|---|
| 1 | 2 | 94 |
| 2 | 5 | 83 |
| 3* | 10 | 46 |
| 4* | 15 | 28 |
| 5* | 20 | 18 |
| 6* | 25 | 13 |

*Not illustrative of the invention; provided for comparative purposes.

EXAMPLE 2

This example illustrates the preparation of soluble protein using cold acid preparation, followed by diafiltration.

A 2-liter portion of clear juice was cooled to 2° C. and adjusted to pH 3.5 with 161 ml. of 1 N hydrochloric acid. The mixture was centrifuged for 15 min. at 1,200 × g. in a refrigerated centrifuge. The collected protein was re-slurried with 2 liters of ice water at pH 3.5 to wash out remaining soluble impurities, and again centrifuged.

The collected protein was dissolved in distilled water and the pH adjusted to 7 to produce a solution containing approximately 1% protein.

A portion of the above solution (105 ml., containing 1.33 g. of protein) was placed in a membrane filtration unit equipped with a membrane which retained molecules of 30,000 molecular weight or greater. The unit was submerged in an ice bath to keep the temperature near 0° C. Vacuum was applied to the side of the membrane opposite that at which the solution was applied.

As the permeate passed through the membrane, distilled water was continuously added to keep the initial volume of the solution constant. This process was continued until a total volume of 1050 ml. of permeate was collected. The liquid which had not passed through the membrane was freeze-dried to yield 1.19 g. of product which contained 89% true protein. This protein was very soluble in water at pH's less than 3.5 and greater than 5.5.

MODIFICATION B

I. In accordance with this embodiment of the invention, the clear juice is first treated by ultrafiltration to yield a concentrate enriched in protein content and to remove impurities. The ultrafiltration is carried out by applying the clear juice under pressure against a membrane which has the ability to retain substances having a molecular weight above a predetermined level but which allows substances of smaller molecular weight to pass through. By selection of the membrane, the cut-off point may be as low as 20,000 or as high as 100,000. In typical cases we use a membrane which retains substances having a molecular weight of 30,000 or more. It has been observed that the substances which pass through such membranes include proteins or protein fragments of low molecular weight, salts, sugars, and amino acids. In addition, much of the brown pigment in the clear juice passes through the membrane. On the other hand, the desired protein is retained by the membrane so that there is formed a concentrate containing this valuable product.

In typical cases, by application of ultrafiltration the clear juice is concentrated to a level of 5–10% (by volume) of the original juice. For example, if 100 volumes of clear juice are applied to the membrane, about 5 to 10 volumes of concentrate will be obtained. It should be noted also that about 75–80% of the brown pigments are removed from the juice. Also the bitter flavor of the juice is largely removed with the permeate. The concentrate contains approximately 90–95% of the original protein but only 20–25% of impurities present in the clear juice. Thus, the protein is not only concentrated but it is also purified.

II. The concentrate from Operation I is purified further by diafiltration. Diafiltration is similar to ultrafiltration with the following important exception: As the concentrate from Step I is pressed against the membrane, water is added to the concentrate to keep the volume thereof constant. Generally, this constant volume is about that of the concentrate initially placed on the membrane. The operation is continued until the volume of water used is about 5 to 10 times greater than the initial volume of concentrate.

The advantage of diafiltration is that the added water aids in removing impurities retained in the concentrate during ultrafiltration. Thus, while the percentage of proteins in the concentrate remains constant, impurities such as salts, sugars, amino acids, brown pigment, undesirable flavor components, and the like are removed. The result is a protein concentrate of much higher purity than that produced by ultrafiltration alone.

An important and unexpected result of the successive application of ultrafiltration and diafiltration is that the protein can be isolated by acid precipitation at ambient (room) temperature without causing denaturation so that the resulting protein product is soluble. This is in sharp contrast to the fact that if acid precipitation is applied directly to the clear juice, the temperature must be kept low (0° to 5° C.) in order to attain a soluble product. Thus an important practical feature of this embodiment is that the acid precipitation can be carried out without the need for refrigeration.

III. The liquid protein-containing product obtained by the successive application of ultrafiltration and diafiltration is then subjected to acid precipitation to isolate the desired protein in a soluble state. To this end the protein-containing liquid at ambient (room) temperature is adjusted to a pH of 3.5–5.5 by the addition of an acid such as hydrochloric, sulphuric, phosphoric, or the like. The resulting precipitate is then collected by centrifugation. This can be done with an ordinary centrifuge; refrigeration is not required. The collected protein is then dissolved in water adjusted to a pH of 7 by addition of an alkali, and centrifuged to remove insoluble material. The resulting supernatant liquid is then dried to yield a dry protein product which contains about 90–95% protein and which is soluble in water at pH's below 3.5 and above 5.5.

It should be noted that this product is soluble even though it was isolated by acid precipitation at ambient temperature. On the other hand, as described in Modification A, if acid precipitation is applied directly to the clear juice, one must use acid precipitation at low temperature (0°–5° C.) in order to attain a soluble product.

EXAMPLE 3

A. Ultrafiltration. One-hundred ml. of clear juice containing 3.6% solids was placed in an ultrafilter unit equipped with a membrane which retains molecules of 30,000 m.w. or greater. The unit was submerged in an ice bath to keep the temperature near 0° C. Vacuum (17 inches Hg.) was applied to the side of the membrane opposite that to which the juice was applied. As permeate passed through the membrane, additional clear juice was added to keep the volume constant. A total of 700 ml. of permeate was collected; it contained 80% of the pigment originally contained in the juice, 78% of the solids, and only 5% of the protein. The concentrate (100 ml.) contained 20% of the solids (salts, sugars, and amino acids) and 90% of the true protein (TCA insoluble N × 6.25).

B. Diafiltration. The concentrate from part A was placed in an ultrafilter equipped with a membrane which retains molecules of 30,000 m.w. or greater. The unit was submerged in an ice bath to keep the temperature near 0° C. Vacuum (17 inches Hg.) was applied to the side of the membrane opposite that to which the juice was applied. As permeate passed through the membrane, distilled water was added to keep the volume of concentrate constant. This was continued until 1,000 ml. of permeate was collected. A portion of the concentrate was freeze-dried, yielding a cream-colored product containing 92% protein and 1% ash, which was soluble in water.

C. Acid precipitation. A portion of the concentrate from part B, at ambient temperature, was adjusted to a pH of 4.8 by addition of 1 N hydrochloric acid. The precipitated protein was separated from residual liquid by centrifuging. The collected protein was washed with water at ambient temperature adjusted to pH 4.8, separated by centrifugation, then dissolved in water containing enough sodium hydroxide to provide a pH of 7. After removal of insoluble material by centrifuging, the solution was freeze-dried. The resulting product contained, on a dry weight basis, 98.6% protein and 1.4% ash. It was soluble in water at pH's below 3.5 and above 5.5.

The following example illustrates a typical method for preparing the clear juice which is used as the starting material in the procedures described in Examples 1–3, above.

A solution was prepared containing 7 gallons of water, 15 lbs. of sodium metabisulphite, and sufficient NaOH to give it a pH of 6. This solution was sprayed on a batch of fresh, green, chopped alfalfa (10,000 lbs.) thus to provide about 0.1 gram of sulphite per 100 grams of fresh alfalfa. The alfalfa was pressed, using a twin-screw press, and the green juice collected.

The green juice was adjusted to a pH of about 6–7 by addition of sodium hyroxide solution and then heated in a steam injection device, in a period of about 0.6 seconds, to a temperature of 55 to 65° C. The juice was held at this temperature for about 10 to 20 seconds, then cooled rapidly (in about 10 seconds) to a temperature of 40°–45° C. The cooled juice was centrifuged to remove the green agglomerate of chloroplastic proteins, chlorophyll, carotenoids, and lipids. The supernatant liquid may then be filtered to remove any chloroplasts not removed in the centrifugation step, thus yielding the desired clear juice.

Having thus described our invention, we claim:

1. A process for isolating soluble, odorless, bland protein, which comprises —
   a. pressing green leafy vegetable material to separate the juice therefrom,
   b. heating the juice to a temperature of about 55°–70° C. in a period of about 0.6 second or less, holding the juice at said temperature for a period of 0 to 40 seconds, and rapidly cooling it to a temperature of about 40°–45° C., whereby to form an agglomerate containing chloroplastic proteins, chlorophyll, carotenoids, and lipids while retaining cytoplasmic proteins in solution in the juice,
   c. separating said agglomerate from the residual juice,
   d. cooling the said residual juice to a temperature of 0° to 5° C. and acidifying it to a pH of 3.5 to 5.5, whereby to precipitate the protein therein,
   e. separating the precipitated protein from the residual juice, and
   f. neutralizing the separated protein to a pH of 7.

2. The process of claim 1 wherein the green leafy vegetable material is alfalfa.

3. A process for isolating soluble, odorless, bland protein, which comprises —
   a. pressing green leafy vegetable material to separate the juice therefrom,
   b. heating the juice to a temperature of about 55°–70° C. in a period of about 0.6 second or less, holding the juice at said temperature for a period of 0 to 40 seconds, and rapidly cooling it to a temperature of about 40°–45° C., whereby to form an agglomerate containing chloroplastic proteins, chlorophyll, carotenoids, and lipids while retaining cytoplasmic proteins in solution in the juice,
   c. separating said agglomerate from the residual juice,
   d. cooling the said residual juice to a temperature of 0° to 5° C. and acidifying it to a pH of 3.5 to 5.5, whereby to precipitate the protein therein, and
   e. separating the precipitated protein from the residual juice.

4. The process of claim 3 wherein the leafy green vegetable material is alfalfa.

* * * * *